US005703984A

United States Patent [19]
Carratt et al.

[11] Patent Number: 5,703,984
[45] Date of Patent: *Dec. 30, 1997

[54] OPTICAL FIBER CABLE WITH PLURAL MODULAR BUNDLES OF HERMTICALLY SEALED OPTICAL FIBERS INSIDE AN OUTER CABLE SHEATH

[75] Inventors: Michel Carratt, Houilles; Michel de Vecchis, Vaureal, both of France

[73] Assignee: Alcatel Cable, Clichy Cedex, France

[*] Notice: The term of this patent shall not extend beyond the expiration date of Pat. No. 5,544,272.

[21] Appl. No.: 530,929

[22] Filed: Sep. 19, 1995

[30] Foreign Application Priority Data

Sep. 23, 1994 [FR] France ................. 94 11400

[51] Int. Cl.⁶ .................................. G02B 6/44
[52] U.S. Cl. ................. 385/106; 385/102; 385/126
[58] Field of Search .................. 385/100, 102, 385/103, 126, 106, 123, 128

[56] References Cited

U.S. PATENT DOCUMENTS

| 4,407,561 | 10/1983 | Wysocki | 385/128 |
| 4,909,593 | 3/1990 | Harbort et al. | 385/109 |
| 4,930,860 | 6/1990 | Tansey et al. | 385/106 |
| 5,155,789 | 10/1992 | Le Noane et al. | 385/106 |
| 5,483,612 | 1/1996 | Gallagher et al. | 385/128 |
| 5,544,272 | 8/1996 | Carratt et al. | 385/128 |

FOREIGN PATENT DOCUMENTS

| 0321788A2 | 6/1989 | European Pat. Off. . |
| 1304408 | 12/1989 | European Pat. Off. . |
| 0468878A1 | 1/1992 | European Pat. Off. . |
| 0553990A1 | 8/1993 | European Pat. Off. . |
| 2532210A1 | 2/1977 | Germany . |
| 3200760A1 | 7/1983 | Germany . |

OTHER PUBLICATIONS

*Patent Abstracts of Japan*, vol. 014, No. 098 (P–1011), 22 Feb. 1990 & JP-A-01 304408 (Furukawa Electric Co. Ltd. The) 8 Dec. 1989 (see JP1304408 above).

*Primary Examiner*—John D. Lee
*Assistant Examiner*—Ellen Eunjoo Kang
*Attorney, Agent, or Firm*—Sughrue, Mion, Zinn, Macpeak & Seas, PLLC

[57] ABSTRACT

The present invention concerns an optical fiber cable containing a plurality of optical fibers split up into modules, each module being covered with a supporting sheath in contact with the outer optical fibers of the module so as to hold the optical fibers contained in said module tightly so that they are mechanically coupled to one another, the entire set of modules being disposed inside a covering made of an insulating material, which covering is in contact with the outer modules of the set of modules so as to form a compact assembly comprising all of the modules;

wherein each optical fiber has a cut-off wavelength of not more than 1,350 nm, and, at a wavelength in the vicinity of 1,550 nm, has a mode field diameter lying in the range 7 μm to 9 μm, and wherein each optical fiber is provided with a substantially hermetic coating on its optical cladding.

7 Claims, 2 Drawing Sheets

OPTICAL FIBER CABLE WITH PLURAL MODULAR BUNDLES OF HERMTICALLY SEALED OPTICAL FIBERS INSIDE AN OUTER CABLE SHEATH

FIELD OF THE INVENTION

The present invention relates to an optical fiber cable.

More particularly, it relates to an optical fiber cable of the type described in patent application EP-0 468 878 or in the article entitled "The microsheath cable: a novel design of ultralightweight single mode optical cable for low cost subscriber loop", International Wire & Cable Symposium Proceedings 1991, i.e. an optical fiber cable having a very high density of optical fibers, in particular for use in local distribution networks. The structure of such a cable is referred to below as a "microsheath structure".

BACKGROUND OF THE INVENTION

A cable having a microsheath structure contains a plurality of optical fibers split up into groups or modules. In certain modules there may be "inner" optical fibers that are surrounded by other optical fibers, and there may be "outer" optical fibers that are directly in contact with a supporting sheath surrounding each of the modules. In this way, each supporting sheath of each module holds the optical fibers contained in the module tightly so that they are mechanically coupled to one another. The entire set of modules is disposed inside a covering made of an insulating material, which covering is in contact with the outer modules of the set of modules so as to form a compact assembly comprising said set of modules. In this way, when a force is applied to the cable, it is transmitted to the optical fibers and is distributed uniformly over all of them.

The major problem posed by cables of microsheath structure lies in the fact that, since the forces applied to the cable are distributed over all of the optical fibers, they degrade both the mechanical characteristics of the optical fibers, and also their transmission properties, in particular because they are subjected to much bending and micro-bending due to the fact that they are held tightly in supporting sheaths. It is been observed that, to avoid such degradation, in particular when the cable is to be installed in long lengths, it is necessary to provide strength members for the structure, and to cause the fibers in each module to be mechanically decoupled from the supporting sheath thereof, which means that the optical fibers must be left loose in each module, thereby reducing the compactness of the finished cable. Furthermore, bending and micro-bending shortens the life of the optical fibers.

OBJECTS AND SUMMARY OF THE INVENTION

An object of the present invention is to solve this problem, i.e. to provide a cable having a tight microsheath structure in which it is possible for the optical fibers to be held tightly together without degrading either their transmission performance levels or their mechanical characteristics once the cable has been installed.

To this end, the present invention provides an optical fiber cable containing a plurality of optical fibers split up into modules, each of said modules being covered with a supporting sheath in contact with the outer optical fibers of said module so as to hold said optical fibers contained in said module tightly so that they are mechanically coupled to one another, the entire set of said modules being disposed inside a covering made of an insulating material, said covering being in contact with the outer modules of said set of modules so as to form a compact assembly comprising all of said modules;

wherein each of said optical fibers has a cut-off wavelength not longer than 1350 nm and, at a wavelength in the vicinity of 1550 nm, has a mode field diameter lying in the range 7 µm to 9 µm, and wherein each of said optical fibers is provided with a substantially hermetic coating on its optical cladding; said substantially hermetic coating may optionally be surrounded by an "outer" coating made of a plastics material or of a thermo-settable material such as a resin. Preferably, the outer coating is thin.

When the optical fibers are subjected to bending and micro-bending, their transmission losses increase due to increased attenuation.

By choosing a cut-off wavelength not longer than 1350 nm, and a mode field diameter in the range 7 µm to 9 µm at a wavelength in the vicinity of 1,550 nm for each of the optical fibers, transmission is improved, i.e. transmission losses are reduced, and the adverse effects of bending and micro-bending are thus avoided.

When mechanical traction or compression forces are applied to the cable, the mechanical properties of the fibers are degraded, and their life is shortened.

By providing each of the optical fibers with a hermetic coating that is thin (and therefore not detrimental to compactness), the life-spans and mechanical characteristics of the fibers are increased, and the adverse effects of stresses generated in this type of cable are thus avoided.

By using such optical fibers in a cable of microsheath structure, it is possible to make the optical fibers considerably less sensitive to bending and micro-bending, which means that they can be held tightly by means of supporting sheaths, and optionally that strength members for taking up the forces applied to the cable can be omitted. The cable of the invention can thus be considerably less bulky than prior art cables, so as to be very compact and particularly well suited to use in distribution networks.

By surrounding each optical fiber with an outer coating made of a thermo-settable or plastics material, it is possible both to protect any surface treatment that might be necessary, and also to identify the resulting coated fiber, the number of available color combinations being greater when the outer coating is made of an extruded plastics material than when it is made of resin.

It should be noted, that extruding an outer coating made of a plastics material on the fiber is made possible because the fiber is less sensitive to micro-bending.

BRIEF DESCRIPTION OF THE DRAWINGS

Other characteristics and advantages of the present invention appear in the following description of an embodiment of a cable of the invention, given by way of non-limiting example and with reference to the accompanying drawings, in which.

In all of the figures, common elements are given the same references.

MORE DETAILED DESCRIPTION

Figure 1:
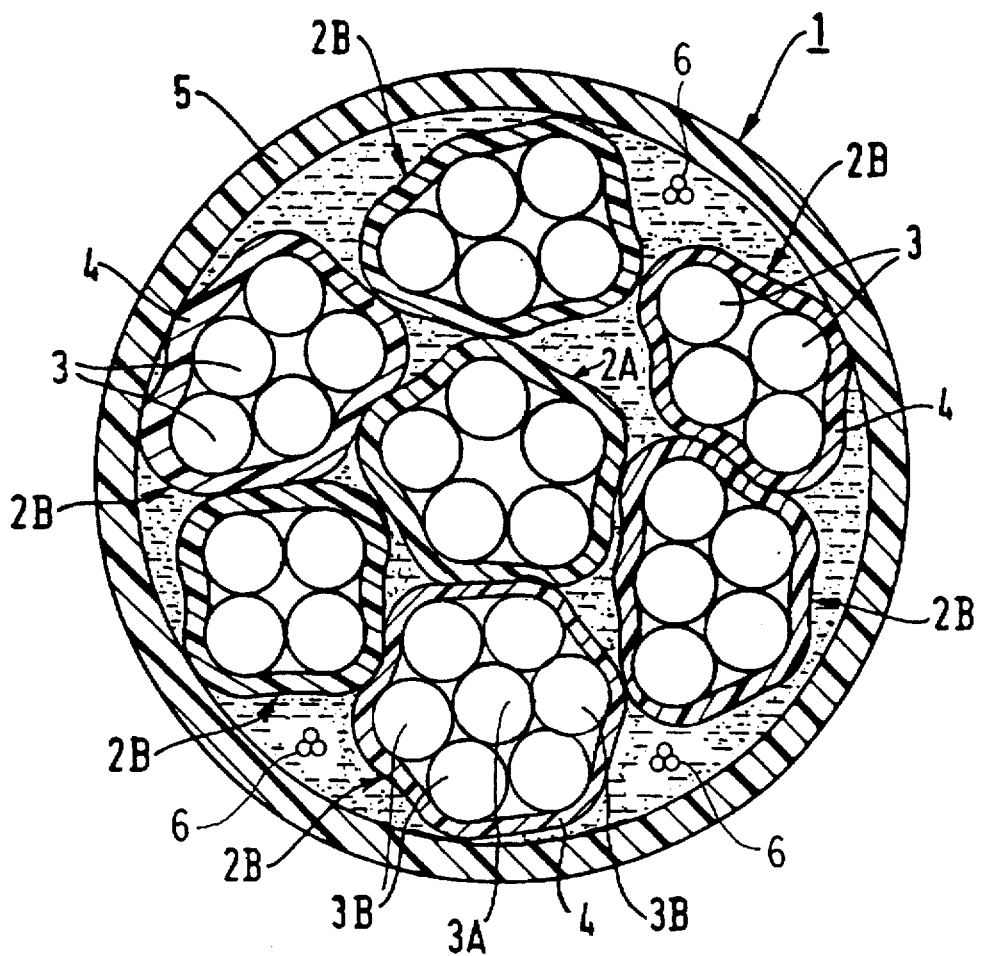
FIG. 1 is a cross-section view of a cable of the invention.

FIG. 1 shows a cable 1 of the invention containing a plurality of modules 2A, 2B of optical fibers 3.

Each module 2A, 2B comprises a plurality of optical fibers 3; in some of the modules 2A, 2B there may be "inner" optical fibers, referenced 3A, that are surrounded by "outer" optical fibers, referenced 3B, which are themselves in contact with a supporting sheath 4 for the modules 2A, 2B. The supporting sheath 4 holds the optical fibers 3 tightly so as to form a compact assembly of said fibers, all of which are in contact with one another inside the modules 2A, 2B, so that they are mechanically coupled to one another and to the supporting sheath 4.

The supporting sheath 4 may be made of any suitable plastics material. It is preferably made of a material having a modulus of elasticity of about 70 daN/mm$^2$, and having a low coefficient of slip on the optical fibers 3, so as to ensure they are held tightly. For example, this material may be a polyolefin. The thickness of the supporting sheaths 4 is preferably about 150 µm. They are therefore compact, and they are easy to tear so as to facilitate connection. Furthermore, the supporting sheaths 4 make it possible to protect the fibers against contraction and expansion forces due to temperature variations.

All of the modules 2A, 2B, are disposed inside a protective covering 5 made of an insulating material which holds them tightly so that they are all in contact with one another, some of the modules 2A, 2B being inner modules, like the module 2A, and others being outer modules, like the modules 2B. The covering 5 is preferably strong (high modulus of elasticity), although this is not essential because of the increased mechanical properties of the fibers used. For example, the material constituting the covering 5 may be chosen from the polyolefin family.

Other outer protective coverings (not shown) may be disposed around covering 5.

To strengthen the cable 1 further, in particular when it is to be pulled over long distances so as to be installed in ducts, strength members having a high modulus of elasticity and having breaking elongation that is higher than that of the optical fibers may be either embedded in the covering 5 itself, or else included in the space delimited thereby, said strength members being either metallic or dielectric, e.g. in the form of strands of aramid or glass fiber.

Figure 2:
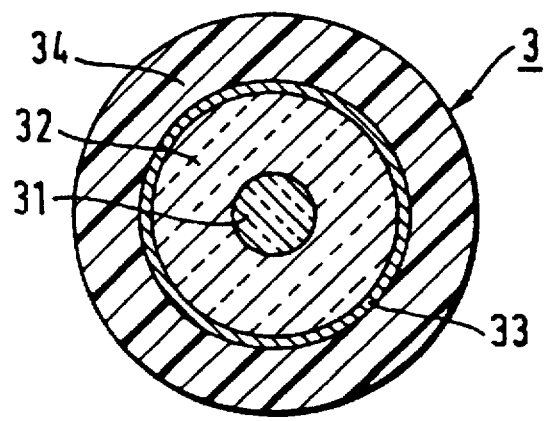
FIG. 2 is a cross-section view of an optical fiber used in a cable of the invention.

As shown in FIG. 2, each of the optical fibers 3 comprises an optical core 31 surrounded by optical cladding 32, both of which are made of a material based on silica, and according to the invention the optical cladding 32 is surrounded by a thin hermetic coating 33 having a thickness of about 0.5 µm, for example. By way of example, the hermetic coating 33 may be made of carbon, of boron, or of doping based on titanium oxide applied to the optical cladding 32.

Also according to the invention, each of the optical fibers 3 has a mode field diameter lying in the range 7 µm to 9 µm at a wavelength in the vicinity of 1,550 nm, and has a cut-off wavelength not longer than 1,350 nm, and preferably in the vicinity of 1,330 nm.

Naturally, the optical fibers 3 may operate equally well at a wavelength of 1,310 nm and at a wavelength of 1550 nm.

Optionally, each of the optical fibers 3 may also be provided with a thin outer coating 34 on the hermetic coating 33, which outer coating is made either of a plastics material that is applied by being extruded over the fiber, or of a thermo-settable material such as a resin that is applied by means of a coating die. The outer coating may carry information identifying the optical fiber, and, in particular, may be colored for this purpose. The optional outer coating 34 need only be used when it is necessary to protect the hermetic coating 33. By choosing a thin outer coating 34, it is also possible to limit the amount of bending and microbending applied to the fiber.

By means of their special structure, the optical fibers 3 are capable in particular of withstanding bending and microbending, and also the stresses applied to the cable, much better than are currently-known fibers, thereby making it possible to implement a microsheath structure without degrading transmission performance levels. The structure of the optical fibers 3 enables them to withstand the stresses applied to the cable 1, which stresses are distributed uniformly over all of them. In particular, for a cable of the invention, losses due to cable-making are less than 0.05 dB/km, whereas, for a prior art cable, such losses are approximately in the range 0.1 dB/km to 1 dB/km.

Another advantage of the cable of the invention lies in the fact that it is not always necessary to dispose an outer coating on the hermetic coating 33, and it is thus possible both to improve the compactness of the optical fiber, thereby increasing the density of the cable, and also to reduce the weight of the cable for a given number of optical fibers (the proportion of silica relative to the proportion of plastics material in a given cross-sectional area of the cable decreases), thereby making it easier to pull the cable during installation operations.

Figure 3:
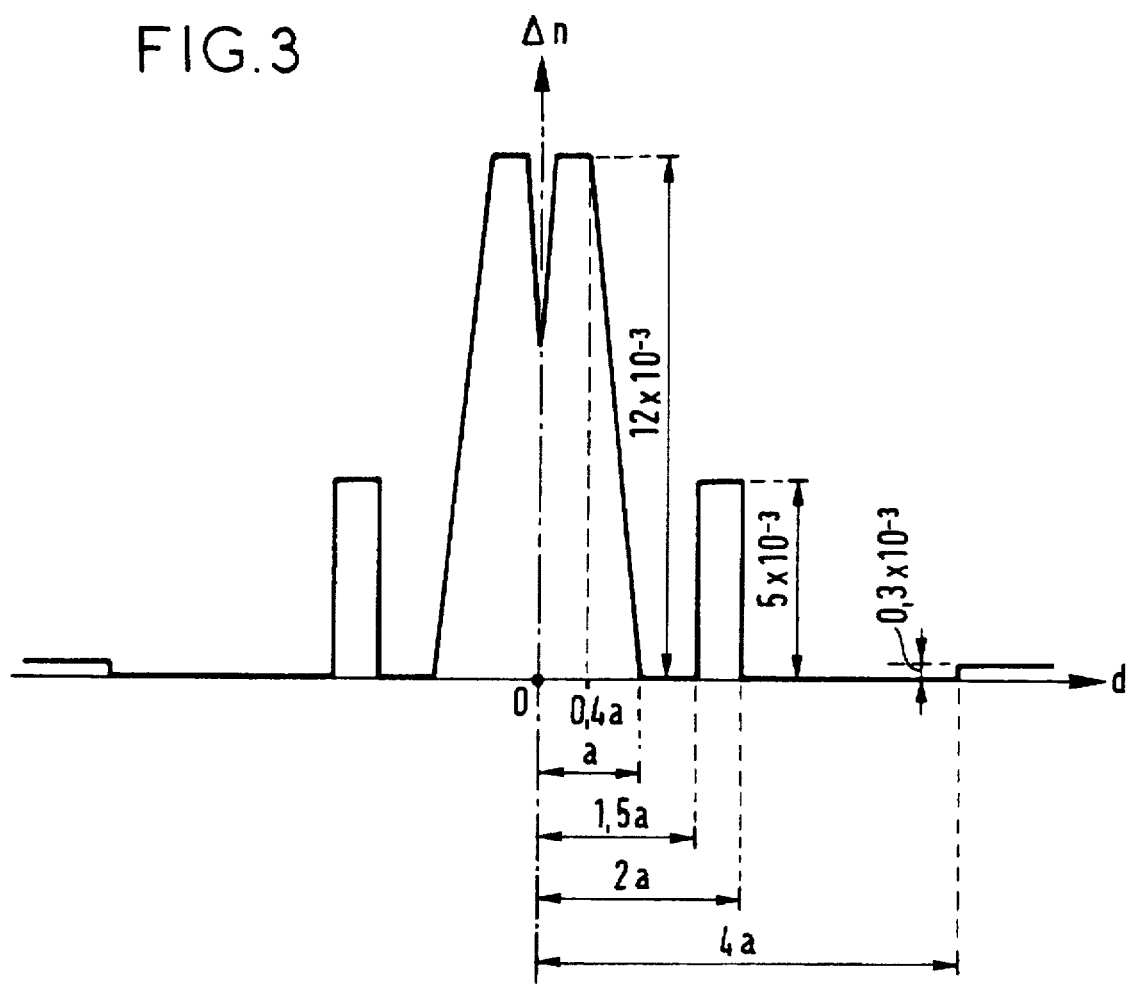
FIGS. 3 and 4 are two examples of index profiles for fibers used in a cable of the invention.
Figure 4:
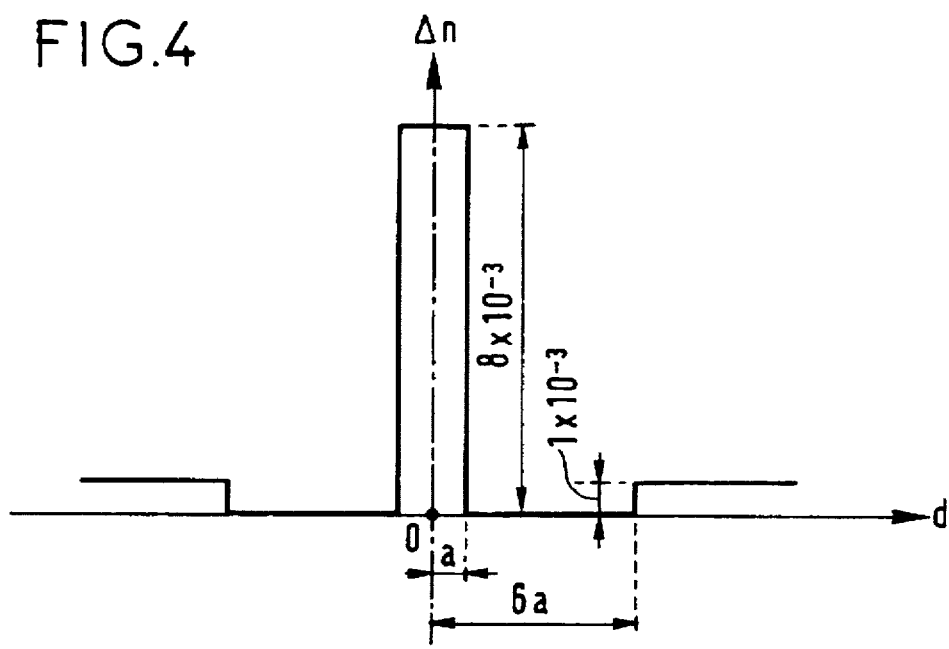

Two non-limiting examples of index profiles that make it possible to obtain this characteristic are shown in FIGS. 3 and 4, in which the difference $\Delta n$ between the refractive indices of the various portions of the optical fiber and the refractive index of the cladding immediately surrounding the core is given as a function of the distance d to the axis of the fiber, $\underline{a}$ being the radius of the core of the optical fiber.

The term "optical core" generally refers to that portion of the optical fiber which conveys most of the light energy, and the term "optical cladding" generally refers to that portion of the optical fiber which surrounds the optical core.

The following dimensions are given by way of example:

diameter of the fiber 3 on the optical cladding 32: 125 µm±3 µm;

thickness of the carbon coating 33:0.5 µm;

thickness of the outer coating 34: approximately 200 µm;

mode field diameter 2 $W_o$ at a wavelength of 1,550 nm: 7.5 µm$\leq$2 $W_o\leq$9 µm; and cut-off wavelength $\lambda_c$: 1,200 nm$\leq\lambda_c\leq$1,280 nm (where $\lambda_c$ is not longer than 1,350 nm).

Naturally, the invention is not limited to the above-described embodiment.

In particular, given the very low sensitivity to microbending of the optical fibers used and their increased resistance to stresses, a variety of materials may be chosen for the supporting sheath 4 and for the covering 5. Preferably, for the supporting sheath 4, a material is chosen that makes it possible to form a fine sheath capable of holding the optical fibers 3 tightly enough.

The supporting sheaths of the modules may have different colors so that they can be easily identified.

The empty space between the modules 2A, 2B and the covering 5 may be filled with a sealant, as may the empty space between the fibers inside the modules 2A, 2B.

Many variations are possible without going beyond the ambit of the invention.

We claim:

1. An optical fiber cable containing a plurality of optical fibers split up into modules, each of said modules being covered with a supporting sheath in contact with the outer optical fibers of said module so as to hold said optical fibers contained in said module tightly so that they are mechanically coupled to one another, the entire set of said modules being disposed inside a covering made of an insulating material, said covering being in contact with the outer modules of said set of modules so as to form a compact assembly comprising all of said modules;

wherein each of said optical fibers has a cut-off wavelength not longer than 1,350 nm, and, at a wavelength in the vicinity of 1,550 nm, has a mode field diameter lying in the range 7 µm to 9 µm, and wherein each of said optical fibers is provided with a substantially hermetic coating on its optical cladding.

2. A cable according claim 1, wherein said substantially hermetic coating is surrounded by an outer coating made of a thermo-settable or plastics material.

3. A cable according to claim 1, wherein said substantially hermetic coating is made of carbon.

4. A cable according to claim 1, wherein said substantially hermetic coating is made of boron.

5. A cable according to claim 2, wherein said outer coating is provided with identification information for identifying each of said optical fibers.

6. A cable according to claim 1, wherein said optical fibers are multi-core optical fibers.

7. A cable according to claim 1, including mechanical strength members.

* * * * *